United States Patent
Yeh

(10) Patent No.: US 9,190,908 B2
(45) Date of Patent: Nov. 17, 2015

(54) PROTECTION COVER ALLOWING HANDHELD DEVICE TO REVERSELY DISCHARGE

(76) Inventor: Ming-Hsiang Yeh, Taipei (TW)

( * ) Notice: Subject to any disclaimer, the term of this patent is extended or adjusted under 35 U.S.C. 154(b) by 586 days.

(21) Appl. No.: 13/562,498

(22) Filed: Jul. 31, 2012

(65) Prior Publication Data

US 2013/0038288 A1 Feb. 14, 2013

(30) Foreign Application Priority Data

Aug. 9, 2011 (TW) .............................. 100214742 U

(51) Int. Cl.
*H02J 7/00* (2006.01)
*H02M 3/158* (2006.01)
*H02M 3/00* (2006.01)

(52) U.S. Cl.
CPC ........... *H02M 3/1582* (2013.01); *H02J 7/0027* (2013.01); *H02J 7/0044* (2013.01); *H02J 7/0054* (2013.01); *H02M 3/005* (2013.01); *H02J 2007/0062* (2013.01)

(58) Field of Classification Search
CPC ..................................................... H02J 7/0054
USPC ................................................. 320/103, 114
See application file for complete search history.

(56) References Cited

U.S. PATENT DOCUMENTS

| | | | |
|---|---|---|---|
| 2004/0204171 A1* | 10/2004 | Chien ........................... | 455/572 |
| 2005/0189913 A1* | 9/2005 | Vitanov et al. ................ | 320/114 |
| 2008/0012427 A1* | 1/2008 | Wilson et al. .................. | 307/66 |
| 2008/0224653 A1* | 9/2008 | Yeh ................................ | 320/103 |
| 2009/0267562 A1* | 10/2009 | Guccione et al. ............. | 320/114 |
| 2010/0093401 A1* | 4/2010 | Moran et al. .................. | 455/566 |
| 2010/0124040 A1* | 5/2010 | Diebel et al. .................. | 361/816 |
| 2011/0316472 A1* | 12/2011 | Han et al. ...................... | 320/103 |
| 2012/0074894 A1* | 3/2012 | Chen et al. .................... | 320/103 |
| 2012/0319487 A1* | 12/2012 | Shah .............................. | 307/66 |

* cited by examiner

*Primary Examiner* — Richard Isla Rodas
*Assistant Examiner* — David V Henze-Gongola
(74) *Attorney, Agent, or Firm* — Bacon & Thomas, PLLC

(57) ABSTRACT

Disclosed is a protection cover allowing a handheld device to reversely discharge, which includes a bidirectional DC-DC converter and a charging/discharging controller arranged inside the protection cover so as to allow a first handheld device that is received in the protection cover to externally discharge electrical power thereof. The protection cover applies a removable external connection to electrically connect to a second handheld device so as to allow the first handheld device to reversely discharge, via the protection cover, to the second handheld device.

7 Claims, 6 Drawing Sheets

PROTECTION COVER ALLOWING HANDHELD DEVICE TO REVERSELY DISCHARGE

FIELD OF THE INVENTION

The present invention relates to a protection cover for handheld device, and in particular to a protection cover that allows the handheld device to reversely discharge.

BACKGROUND OF THE INVENTION

The progress of science and technology makes more and more handheld device (or handheld electronic device) carried by a user, such as a mobile phone, digital camera, digital camcorder, navigation device, and notebook computer that can are often carried by a user when the user is going out or taking a tour. These different handheld devices have dedicated rechargeable cells and rechargers for the purposes of recharging the rechargeable cells when they run out of power.

However, such handheld devices have individual and independent power supply system. Consequently, when one of these handheld devices runs out of power, it is not possible for the other handheld devices that may have extra powers to provide a supply of power to the run-out-of-power device.

Further, since it is often that more than two or three handheld devices (such as those listed above) are carried by a user going out of town or taking a trip, a number of chargers must also be carried, plus 110/220 volt power adaptors and various types of power plugs for use in different zones. It is apparently troublesome and inconvenient.

Thus, the present invention aims to provide a solution to overcome the above problems.

SUMMARY OF THE INVENTION

An object of the present invention is to provide a protection cover that allows a handheld to reversely discharge, wherein a circuit is provided in the protection cover that allows the handheld to reversely discharge so that in an emergency situation, the electrical power of the handheld device can be discharged through the protection cover to another handheld device.

Another object of the present invention is to provide a protection cover that allows a handheld to reversely discharge, wherein a protection cover that is provided to make a handheld device received therein reversely discharge comprises therein a protection cover battery, which may selectively charge a rechargeable cell of the handheld device (internal charging) so as to show an advantage of convenience.

To achieve the above objects, the present invention provides a protection cover allowing a handheld device to reversely discharge. The handheld device comprises a charging connector and a rechargeable battery electrically connected to each other. The protection cover comprises: a counterpart charging connector, a rechargeable/dischargeable protection cover battery, a first connector, a bidirectional DC-DC converter, a charging/discharging controller, a second connector, and a charging/discharging selection switch. The counterpart charging connector is electrically connectable to the charging connector of the handheld device. The bidirectional DC-DC converter comprises a DC-DC buck-boost circuit module. The charging/discharging controller comprises an overload protection circuit module. The charging/discharging controller is electrically connected to the bidirectional DC-DC converter. The first connector and the bidirectional DC-DC converter are electrically connected to a positive terminal of the protection cover battery. The charging/discharging controller is electrically connected through the counterpart charging connector to a negative terminal of the protection cover battery. The counterpart charging connector is further electrically connected to the charging/discharging controller. The second connector is electrically connected to the bidirectional DC-DC converter. The charging/discharging selection switch is electrically connected to the charging/discharging controller, whereby through selection made through the charging/discharging selection switch, the charging/discharging controller controls one of the protection cover battery and the rechargeable battery to perform external discharging through the bidirectional DC-DC converter. The charging/discharging controller alternatively controls the protection cover battery to perform one of charging the rechargeable battery and internal charging via the bidirectional DC-DC converter.

As such, the handheld device is allowed to discharge, via the protection cover, electrical power thereof to another handheld device for supplementing electrical power thereby achieving the purpose of reversely discharging.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 2:
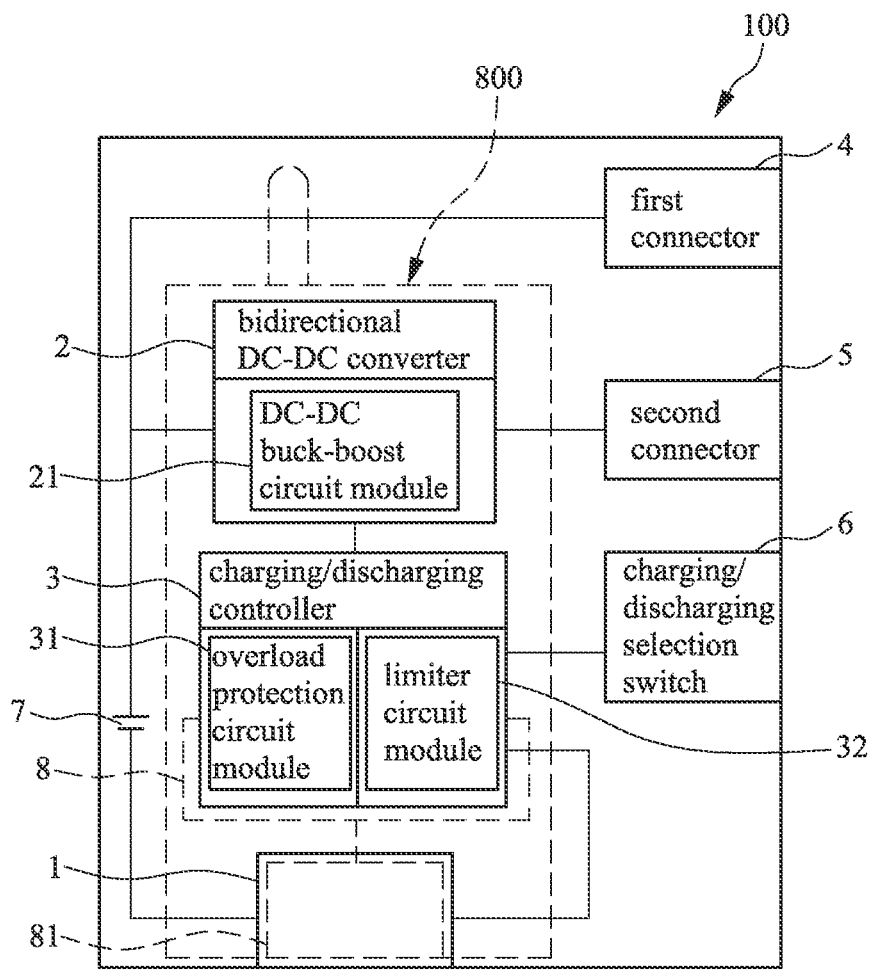
FIG. 2 is a schematic view showing the handheld device received in the protection cover shown in FIG. 1.
Figure 4:
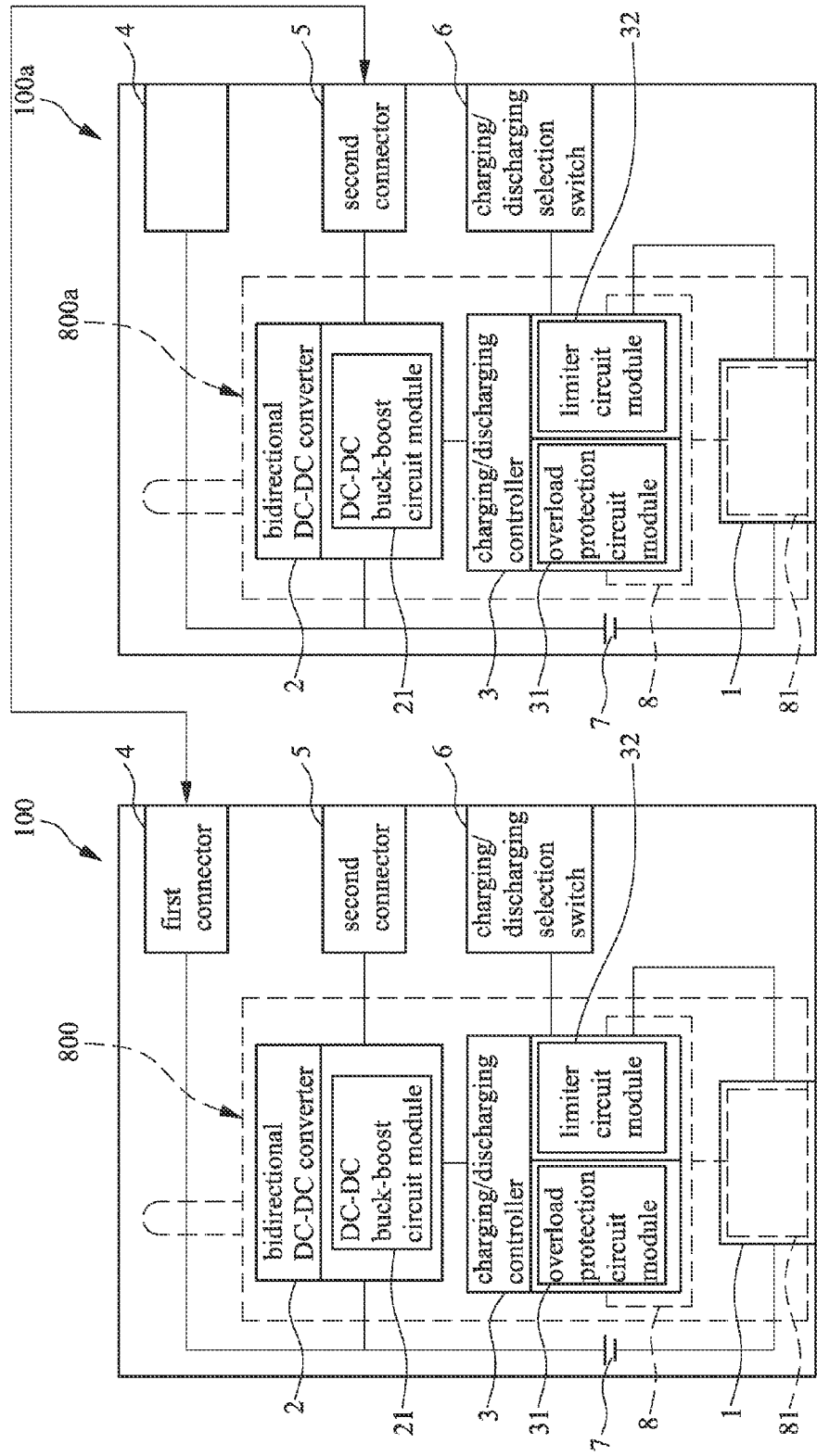
FIG. 4 is a schematic view illustrating two protection covers that receive therein handheld devices are operated to perform mutual charging and discharging therebetween.

The present invention provides a protection cover allowing a handheld device to reversely discharge, wherein an handheld device that is enclosed by the protection cover of the present invention is allowed to electrically discharge to another handheld device (as shown in FIG. 2) or two handheld devices that are both covered by the protection covers of the present invention to perform mutual charging and discharging with respect to each other (as shown in FIG. 4).

Figure 1:
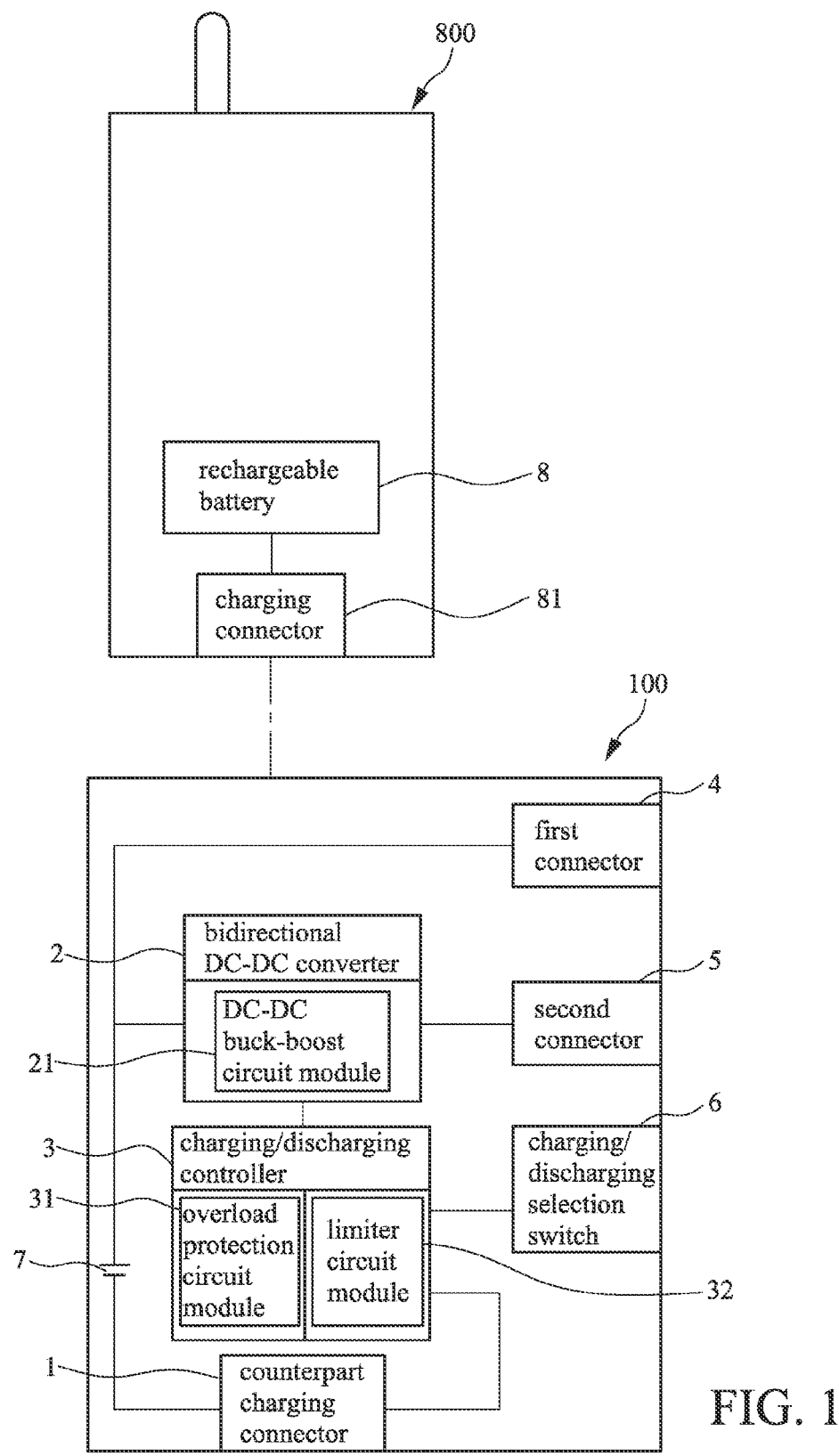
FIG. 1 is a schematic view showing a protection cover according to the present invention before a handheld device is received therein.

With reference to the drawings and in particular to FIGS. 1 and 2, the present invention provides a protection cover allowing a handheld device to reversely discharge, in which a handheld device 800 is provided with a charging connector 81 and a rechargeable battery 8 electrically connected to the charging connector. The rechargeable battery 8 is repeatedly rechargeable for supplying electrical power to the handheld device 800. The protection cover 100 comprises: a counterpart charging connector 1, a bidirectional DC-DC converter 2, a charging/discharging controller 3, a first connector 4, a second connector 5, a charging/discharging selection switch 6, and a protection cover battery 7.

Figure 5A:
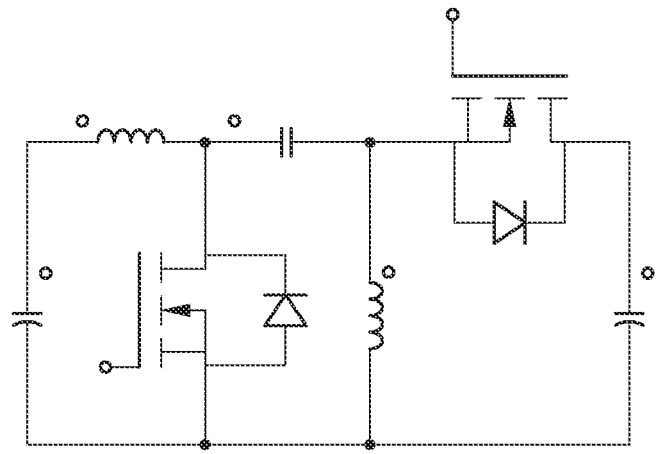
FIGS. 5A-5D shows four examples of circuit diagrams of bidirectional DC-DC converter of the protection cover according to the present invention.
Figure 5B:
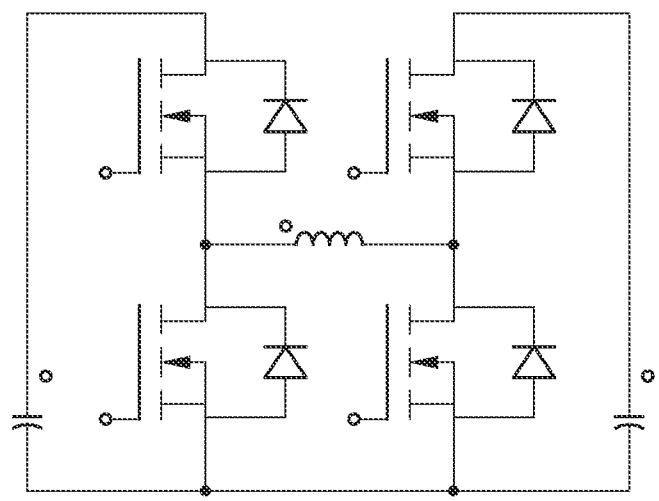
Figure 5C:
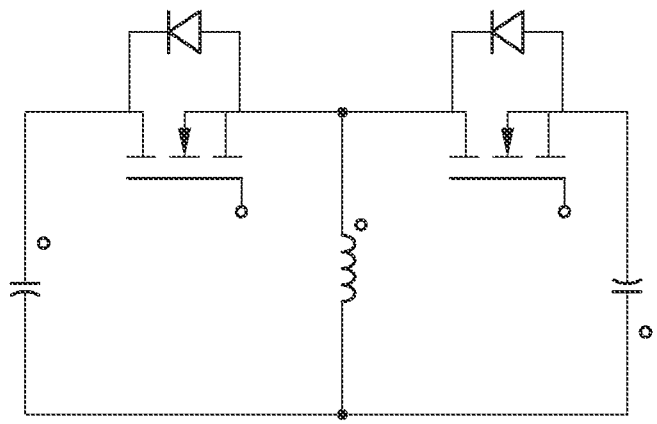
Figure 5D:
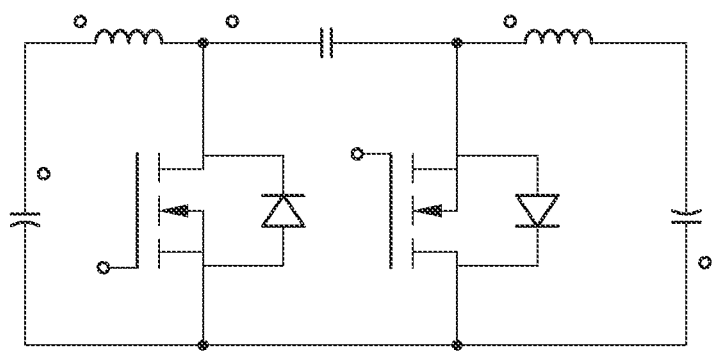

The bidirectional DC-DC converter 2 comprises a DC-DC buck-boost circuit module 21. FIGS. 5A-5D show four feasible examples of circuit diagram of the bidirectional DC-DC converter 2 (in which FIG. 5A shows a SEPIC (Single-Ended Primary Inductor Converter)-ZETA bidirectional DC-DC circuit, which comprises a transistor connected in parallel to a diode of an original SEPIC circuit and a diode connected in parallel to a transistor of the original SEPIC circuit in order to realize bidirectional charging/discharging. Applying the same manner, a buck-boost converter circuit can be modified as a buck-boost DC-DC circuit shown in FIG. 5B. FIG. 5C illustrates a bidirectional DC-DC circuit formed by modifying a fly-back converter circuit. FIG. 5D illustrates a bidirectional DC-DC circuit formed by modifying a Cuk converter circuit.)

Figure 3:
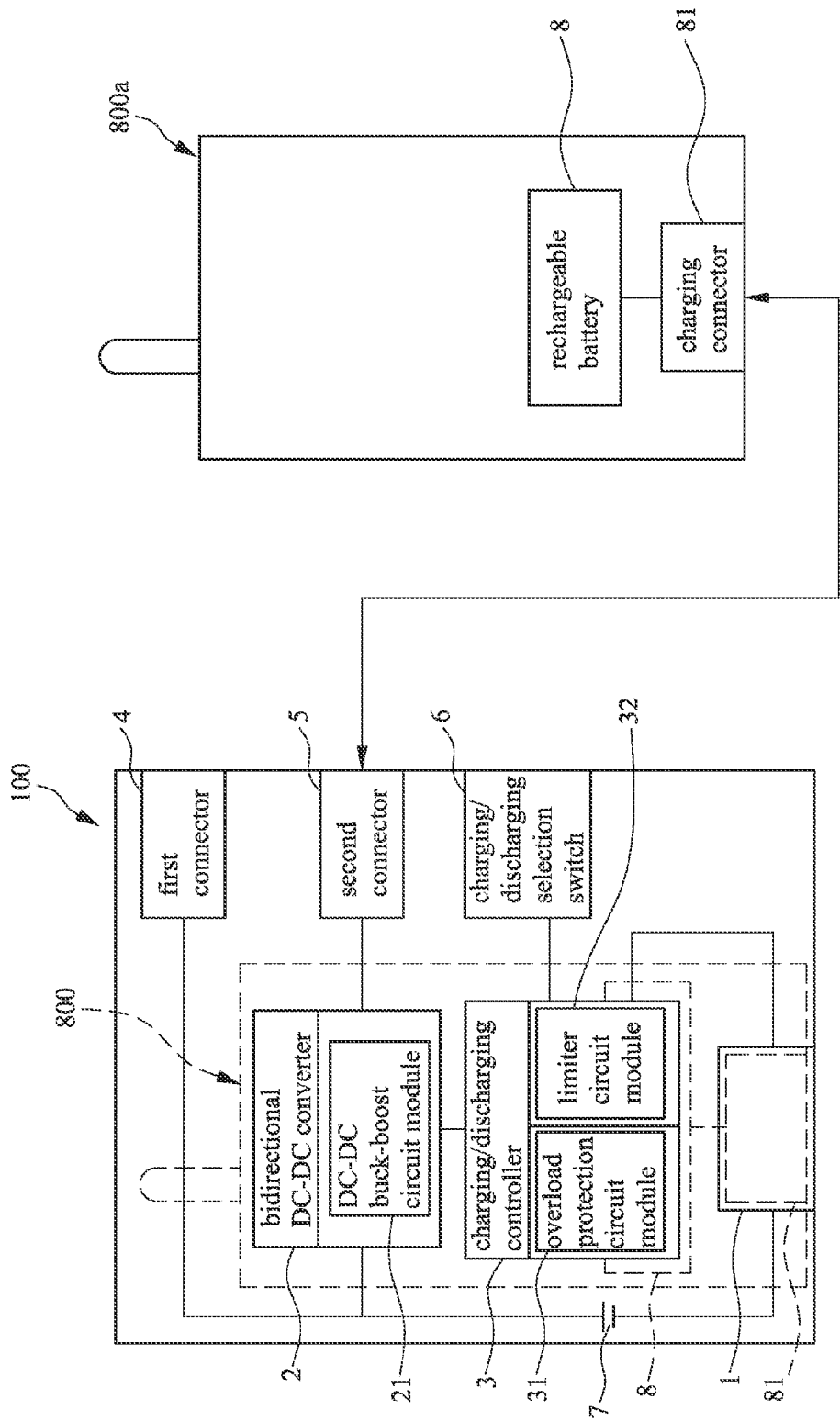
FIG. 3 is a schematic view illustrating the protection cover that receives therein a handheld device is operated to discharge to another handheld device.

The charging/discharging controller 3 comprises an overload protection circuit module 31 and preferably further comprises a limiter circuit module 32 to limit external discharging so as to prevent the rechargeable battery 8 of the handheld device 800 enclosed in the protection cover 100 from completely discharging the electrical power thereof to another handheld device (such as reference 800A of FIG. 3). The charging/discharging controller 3 is electrically connected to the bidirectional DC-DC converter 2. The first connector 4 and the bidirectional DC-DC converter 2 are electrically connected to a positive terminal of the protection cover battery 7 and the charging/discharging controller 3 is electrically connected, via the counterpart charging connector 1, to a negative terminal of the protection cover battery 7. The second connector 5 is electrically connected to the bidirectional DC-DC converter 2. The charging/discharging selection switch 6 is electrically connected to the charging/discharging controller 3, whereby with a selection made through the charging/discharging selection switch 6, the charging/discharging controller 3 controls the protection cover battery 7 or the rechargeable battery 8 to effect external discharging through the bidirectional DC-DC converter 2 or the charging/discharging controller 3 controls the protection cover battery 7 to effect internal discharging, via the bidirectional DC-DC converter 2, to the rechargeable battery 8 of the handheld device 800 received in the protection cover 100 (namely the protection cover battery 7 being allowed to charge the rechargeable battery 8 of the handheld device 800 received in the protection cover 100 by having the charging connector 81 and the counterpart charging connector 1 electrically engaging each other). Further, a charger that is not shown in the drawings may be externally connected to the protection cover 100 to charge the protection cover battery 7 or the rechargeable battery 8 (which is the rechargeable battery 8 of the handheld device 800 received in the protection cover 100).

The first connector 4 and the second connector 5 are provided with fool-proof designs to prevent incorrect connection. Preferably, the first connector 4 and the second connector 5 are micro USB (Micro Universal Serial Bus) connectors. The universality and general purpose of the micro USB provides convenience of use for the present invention. The limiter circuit module 32 of the charging/discharging controller 3 can be either a power meter that controls electrical current of charging operation or a timer that controls the time period in which the charging operation is performed. The bidirectional DC-DC converter 2 may use the DC-DC buck-boost circuit module 21 to adjust the level of voltage of discharging and charging of the rechargeable battery 8.

Further, to prevent electrical leakage of the charging connector of all kinds of handheld device, heretofore a specific design is provided in the existing circuit module (not labeled) of a handheld device in order to allow the charging connector to only be operable for internal charging, but not external discharging. To realize the purpose of reversely discharging of the present invention, cooperation of the manufacturers of handheld devices is necessary to modify the specific design of circuit module to allow discharging in a reverse direction. Thus, besides being charged through the charging connector 81, the rechargeable battery 8 of the handheld device 800 is also allowed to reversely discharge through the protection cover 100 of the present invention (reversely and externally discharging), namely being capable of charging other handheld devices.

Referring to FIG. 3, a schematic view is provided to illustrate the condition when the protection cover 100 of the present invention that encloses a handheld device 800 (located on the left hand side portion of FIG. 3) discharges to another handheld device 800A (located on the right hand side portion of FIG. 3). The protection cover 100 located on the left hand side portion of FIG. 3 is shown in solid lines, while the handheld device 800, being received in the protection cover 100, is shown in phantom lines. As shown, a user may select discharging operation by using the charging/discharging selection switch 6 of the left-hand side the protection cover 100 so that the charging/discharging controller 3 controls the protection cover battery 7 or the rechargeable battery 8 of the handheld device 800 to start externally discharging. The electrical power so discharged may step up or step down through DC-DC buck-boost circuit module 21 of the bidirectional DC-DC converter 2 to meet the required voltage level of a charged object (such as the handheld device 800A on the right hand side portion of FIG. 3). As shown, a line (not labeled) connecting between the second connector 5 of the protection cover 100 and the charging connector 81 of the handheld device 800A may discharge the electrical power from a built-in protection cover battery 7 of the protection cover 100 or the electrical power from the rechargeable battery 8 of the handheld device 800 received in the protection cover 100 to the rechargeable battery 8 of the handheld device 800A so as to easily transfer electrical power of the handheld device 800 (or that of the protection cover battery 7) through reversely discharging via the protection cover 100 to another handheld device 800A, whereby a user does not need to carry a dedicated charger and 110/220V converter for fear of running out of power when going out. To make the protection cover 100 of the present invention applicable to all kinds of handheld devices, micro USB is adopted in the present invention as a general purpose connector so that all kinds of handheld device 800 can discharge via the protection cover 100 of the present invention to any other types of handheld device 800A (namely external charging).

Referring to FIG. 4, a schematic view is provided for illustrating mutual discharging/charging performed between two protection covers 100, 100A both receiving therein a handheld device 800, 800A. As shown, a user may select discharging operation by using the charging/discharging selection switch 6 of the left-hand side the protection cover 100 so that the charging/discharging controller 3 controls the protection cover battery 7 or the rechargeable battery 8 of the handheld device 800 received therein to start externally discharging. The electrical power so discharged may step up or step down through DC-DC buck-boost circuit module 21 of the bidirectional DC-DC converter 2 to meet the required voltage level of a charged object (such as the handheld device 800A on the right hand side portion of FIG. 4). As shown, a line (not labeled) connecting between the first connector 4 of the left hand side protection cover 100 and the second connector 5 of the right hand side protection cover 100a may discharge the electrical power from the protection cover battery 7 or the electrical power from the rechargeable battery 8 of the handheld device 800 received in the left hand side protection cover 100 to the rechargeable battery 8 of the handheld device 800A received in the right hand side protection cover 100*a* (namely external charging).

In case that the handheld device 800 itself is running out of power, the built-in protection cover battery 7 of the protection cover 100 may discharge to the rechargeable battery 8 of the handheld device 800 received in the protection cover 100 (namely internal charging).

In summary, the present invention provides a protection cover allowing a handheld device to reversely discharge of which the features are that through specific designs of circuit components and structure, a rechargeable battery 8 of a handheld device 800 that is received in and electrically connected to the protection cover 100 according to the present invention is allowed to reversely discharge, rather than simply supplying electrical power to a handheld device 800 in the known art (it being necessary to have the cooperation of the manufacturers of handheld device to modify the original circuit modules in such a way as to allow of reverse discharge), whereby the electrical power of a built-in protection cover battery 7 of the protection cover 100 or electrical power from a rechargeable battery 8 of a handheld device 800 can be reversely discharged through the protection cover 100 to supplement the electrical power of another handheld device 800A (or another handheld device 800A received in another protection cover 100A of the present invention) so as to achieve the purposes of reversely discharging. Further, it is no longer necessary to carry out a large number of various types of heavy chargers, converters, and different electrical plugs, when a user is going out of town or taking a trip. The protection cover battery 7 built in the protection cover 100 is also capable of charging a rechargeable battery 8 of a handheld device 800 received in a protection cover 100 (namely internal charging) to thereby provide an advantage of convenience. The bidirectional DC-DC converter 2 and the DC-DC buck-boost circuit module 21 thereof may allow electrical power of boosted or bucked voltage to output in order to meet various voltage requirements of different handheld devices, or may even speed up charging/discharging operation by voltage boosting by the DC-DC buck-boost circuit module 21.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A protection cover allowing a handheld device to reversely discharge, the handheld device comprising a charging connector and a rechargeable battery electrically connected to each other, the protection cover comprising:

a counterpart charging connector, which is electrically connectable to the charging connector of the handheld device;

a protection cover battery, which is a rechargeable/dischargeable battery;

a first connector;

a bidirectional DC-DC converter, which comprises a DC-DC buck-boost circuit module;

a charging/discharging controller, which comprises an overload protection circuit module, the charging/discharging controller being electrically connected to the bidirectional DC-DC converter, the first connector and the bidirectional DC-DC converter being electrically connected to a positive terminal of the protection cover battery, the charging/discharging controller being electrically connected through the counterpart charging connector to a negative terminal of the protection cover battery;

a second connector, which is electrically connected to the bidirectional DC-DC converter; and a charging/discharging selection switch, which is electrically connected to the charging/discharging controller, whereby through selection made through the charging/discharging selection switch, the charging/discharging controller controls either one of the protection cover battery and the rechargeable battery to perform external discharging to a handheld device through the bidirectional DC-DC converter, the charging/discharging controller alternatively controlling the protection cover battery to perform internal charging to the rechargeable battery via the bidirectional DC-DC converter.

2. The protection cover allowing a handheld device to reversely discharge as claimed in claim 1, wherein the first connector and the second connector are provided with a fool-proof design.

3. The protection cover allowing a handheld device to reversely discharge as claimed in claim 1, wherein the first connector and the second connector are micro USB connectors.

4. The protection cover allowing a handheld device to reversely discharge as claimed in claim 1, wherein the charging/discharging controller comprises a limiter circuit module to limit external discharging.

5. The protection cover allowing a handheld device to reversely discharge as claimed in claim 4, wherein the limiter circuit module comprises a power meter.

6. The protection cover allowing a handheld device to reversely discharge as claimed in claim 4, wherein the limiter circuit module comprises a timer.

7. The protection cover allowing a handheld device to reversely discharge as claimed in claim 1, wherein the bidirectional DC-DC converter uses the DC-DC buck-boost circuit module to adjust level of voltage in discharging and charging.

\* \* \* \* \*